United States Patent
Error et al.

(10) Patent No.: US 10,205,623 B2
(45) Date of Patent: Feb. 12, 2019

(54) CUSTOM EVENT AND ATTRIBUTE GENERATION FOR USE IN WEBSITE TRAFFIC DATA COLLECTION

(75) Inventors: Brett Error, Orem, UT (US); Chris Error, Orem, UT (US); Brian Curran, Draper, UT (US)

(73) Assignee: Adobe Systems Incorporated, San Jose, CA (US)

( * ) Notice: Subject to any disclaimer, the term of this patent is extended or adjusted under 35 U.S.C. 154(b) by 3064 days.

(21) Appl. No.: 10/608,442

(22) Filed: Jun. 26, 2003

(65) Prior Publication Data

US 2004/0122943 A1    Jun. 24, 2004

Related U.S. Application Data

(60) Provisional application No. 60/393,004, filed on Jun. 28, 2002.

(51) Int. Cl.
*H04L 29/06* (2006.01)
*H04L 29/08* (2006.01)

(52) U.S. Cl.
CPC .............. *H04L 29/06* (2013.01); *H04L 67/02* (2013.01); *H04L 67/22* (2013.01); *H04L 69/329* (2013.01)

(58) Field of Classification Search
USPC ......... 705/1, 26; 707/10; 709/219, 224, 238, 709/340, 202, 203; 790/224
See application file for complete search history.

(56) References Cited

U.S. PATENT DOCUMENTS

| | | | |
|---|---|---|---|
| 5,796,952 A * | 8/1998 | Davis et al. | 709/224 |
| 6,112,238 A * | 8/2000 | Boyd et al. | 709/224 |
| 6,766,370 B2 * | 7/2004 | Glommen et al. | 709/224 |
| 6,792,458 B1 * | 9/2004 | Muret et al. | 709/224 |
| 6,804,701 B2 * | 10/2004 | Muret et al. | 709/203 |
| 7,020,622 B1 * | 3/2006 | Messer | 705/26.44 |
| 7,146,416 B1 * | 12/2006 | Yoo et al. | 709/224 |
| 7,185,085 B2 * | 2/2007 | Bean | 709/224 |
| 7,310,609 B2 * | 12/2007 | Middleton et al. | 705/14.41 |
| 2001/0044820 A1 * | 11/2001 | Scott | 709/202 |
| 2002/0174174 A1 * | 11/2002 | Ramraj et al. | 709/203 |
| 2003/0023489 A1 * | 1/2003 | McGuire et al. | 705/14 |
| 2003/0046385 A1 * | 3/2003 | Vincent | 709/224 |
| 2004/0015580 A1 * | 1/2004 | Lu et al. | 709/224 |

FOREIGN PATENT DOCUMENTS

WO    WO 01/31492 A2 *   5/2001   ............. G06F 17/00

* cited by examiner

*Primary Examiner* — Andrew B Whitaker
(74) *Attorney, Agent, or Firm* — Kilpatrick Townsend & Stockton LLP (57) ABSTRACT

A method and system for the efficient customization of website tracking data includes a data collector with a user interface for assigning custom events and attributes to events occurring on a website. The data collector receives custom tracking data from the website in response to the occurrence of an event to be tracked. Customization of tracking data is achieved through the use of an embedded tracking code and associated data collection file. The embedded tracking code is configured to report tracking data customized for the website. The data collection server is configured via a graphical user interface to receive and store the customized tracking data. A configuration string from the data collector is inserted into the data collection file on the web site. In this manner, the data collection server and website is customized to collect customized tracking data efficiently without assistance from others.

18 Claims, 7 Drawing Sheets

CUSTOM EVENT AND ATTRIBUTE GENERATION FOR USE IN WEBSITE TRAFFIC DATA COLLECTION

RELATED APPLICATIONS

This application claims priority under 35 U.S.C. § 119(e) to U.S. Provisional Application Ser. No. 60/393,004, filed Jun. 28, 2002, entitled "Custom Insight Module," the contents of which are incorporated by reference. This application is related to U.S. patent application Ser. No. 10/608,515 entitled "Click-Stream Data Collection", filed on Jun. 26, 2003.

TECHNICAL FIELD

This invention relates to tracking user traffic on websites, and more specifically, to a method and system for generating custom events and attributes related to those events to be collected and analyzed by a data collection server.

BACKGROUND

One of the most common sales mantras is "know your customer." This basic tenet of selling has grown far beyond knowing who enters the store; it requires among other things, knowing what attracts customers, what they look at, how they move around the store, and how long they stay. By studying customer buying habits, retailers have been able to maximize their revenues through tailoring their promotions, offerings and even store layouts to suit their customers' preferences and habits.

For bricks-and-mortar sellers of goods and services, gathering such data rapidly becomes cost-prohibitive. Identifying basic information about customer behavior at the checkout stand may be fairly cost-effective; but monitoring a customer's path through the store or how long customers spend selecting a particular product requires much more expensive monitoring. In contrast, such behavioral tracking in the on-line environment occurs without significant increases in cost, thus making complex data collection not only possible, but a requirement to remain competitive.

In the on-line environment, customer behavior may be tracked by the website server containing the website visited by the customer, or by another server, such as a remote data collector, which may be remotely located. The data collector is notified of activity on a website so that it can monitor and track the activity. One method of achieving this notification is through the use of a request for embedded content.

Embedded content is part of a web page, such as an image, that is requested as a separate file from the file containing the web page. The separate file may be requested from the server containing the website or from a remote server, such as a remote content server or data collection server. For example, when a user requests a web page from a website server, the website server sends the web page file to the user's client. The client, such as a web browser, then attempts to render the file as a viewable web page. However, upon rendering the web page file, the client may find a reference to a separate file located on the website server or a remote server. After the content is located and sent to the client, the client renders the separate file containing the embedded content along with the original web page.

A web bug is a particular type of embedded content where the content itself is irrelevant, but the request for content carries useful information. For example, a web bug is often a 1 pixel by 1 pixel, clear image. This image is small enough to appear invisible to the user. When the client encounters the web bug code upon rendering a web page, the client sends the request and additional information about the user and the user's environment to the server indicated by the web bug code. The request can include the data from a cookie, or other information gathered as a result of the execution of a script that occurred when the web page was rendered. Where the server indicated by the web bug code is a data collection server, the data collection server may set an additional cookie for identification for tracking purposes. In this manner, the web bug request can be used to indicate to a data collection server that a particular web page is being rendered.

One method for including the request is to write the request as a static image tag in Hyper Text Markup Language (HTML). The following is an example of an image tag in HTML:

<imgsrc="http://ad.datacollectionserver.com/
tracker.exe?AID=14658&PID=259294&banner=
0.gif"width=1height=1border=0>

Here, the term "ad.datacollectionserver.com" refers to the address of the data collector.

Another common method of including the request is to use a scripting language, such as JavaScript. One advantage of using a script instead of a static image tag is that the script can perform other functions including gathering additional data and sending it along with the request. In either case, the result is a request sent to the data collection server upon the occurrence of an event, such as the loading and rendering of a web page. Once the request has been sent to the data collector, the data collector can begin performing tracking functions.

This common method suffers from several significant drawbacks. Existing data collection systems generally use a set of predefined events. A data collection system provider may create a set of web bug requests that a website operator can paste in web pages on the website. These web bug requests have been created by the data collection system provider to identify specific events, such as the opening of a home web page or a check-out page. These events are coded in the web bug request itself, or in an environment variable that is sent to the data collector along with the request. The website operator, however, cannot change the event identified in the web bug request without having the data collection system provider to modify the data collection system receiving the requests.

In many cases, the predefined events of the data collection system may not accurately identify the events a website operator would like to track. For example, an auction website operator may want to track every time a bid is placed. But the data collector may not have a predefined event describing such an action. The auction website operator may use a predefined event, such as a page load event, if that predefined event occurs when a bid is actually placed. Even with this approach, the event identified in the web bug request may not identify "Bids Placed," but rather, may indicate "Page Load."

The predefined nature of this approach limits the flexibility of web operators to accurately describe events to be tracked. The auction website operator could use some predefined event such as product page view for indicating when a bid is placed, if the bid causes a new page to be requested. But the event would not accurately describe the bid event and may be confused with other data tracking product page events. Such an approach does not lend itself well to all websites.

Similarly, the auction website operator may want to record other data about the bid environment when the bid was placed. For example, the website operator may want to track the bid amount, the time of the bid, the increase over the last bid, and other attributes. Such customization is generally impossible or extremely difficult using existing data collection systems.

Furthermore, in existing data collection systems, when the website operator wishes to change an event or the data sent to the data collection server upon the occurrence of an event, the operator must normally contact a data collection server administrator. The data collection server administrator modifies the configuration of the data collection server to collect and process the custom event or data. Then, the data collection server administrator makes changes to the code that contacts the data collection server; either the website operator or the data collection server administrator then inserts the new code into the web page. Because the website operator must enlist the aid of the data collection server administrator, these changes are costly and inefficient. The problem is further exacerbated when multiple changes to multiple web pages and websites are required.

What is needed is a system or method wherein the website operator can design and implement events that more carefully match the website. What is further needed is a system wherein the website-operator is able to select data to send to the data collection server, and to make changes at random, without the assistance of the data collection server administrator. A system or method that would allow the efficient customization and modification of the tracking events and data would be of great value to website operators.

SUMMARY OF THE INVENTION

The present invention solves the above problems by providing a method and system for efficient customization of events and associated data for tracking website traffic. The present invention allows the website operator to customize events so that the tracking data more closely matches a customer's actions on the website. The present invention also provides a method for assigning other data to events that can be passed to the data collection server upon the occurrence of selected events. The website operator can also implement these customizations without the assistance of the data collection server administrator.

The present invention provides for two types of customization: Custom events and custom attributes. The website operator can assign custom events to many actions on a website beyond those available with existing data collection systems. The website operator can assign custom names to page views to define events such as opening a product's web page. For example, on a website selling cars, the website operator could assign the name of the car to the event of opening that car's web page.

In addition, the invention can track events not associated with a page view. For example a website may include a product demo. Existing data collection systems can track the opening of the page where the demo is located. The present invention can track the playing of the demo as a unique event with its own associated data, separate from the event of opening the web page containing the product demo. Other events such as scrolling across to the bottom of the screen, or moving a mouse over a link, can be tracked as custom events with their own data.

Furthermore, the present invention allows website operators to customize the data associated with events to closely match their tracking requirements. The website operator can define custom attributes and configure the website server to pass data to be tracked to the attribute upon the occurrence of an event. The website operator can also define how the attribute will interact with other events. For example, the website operator can define when an attribute value will expire and be replaced by another value. The expiration can occur after a set time period or after the occurrence of a particular event. Moreover, the website owner can select the data type for the attribute and assign version information for use in data analysis.

The present invention allows the website operator to customize events and attributes by providing a flexible method for collection and analysis. The present invention allows the website operator to determine the events and attributes that require tracking and how the attributes should interact with other events. Variable type, expiration and version information are assigned to the attributes.

The invention provides a graphical user interface for configuring events and attributes on the data collection server. The website operator can configure each custom event by naming those events using the graphical user interface ("GUI"). The GUI also provides a combination of text and drop-down selection boxes to select the various options for attributes associated with each event. Once these options have been specified, the data collection server is prepared to collect and store the custom event and attribute data.

In one embodiment, in order to avoid time-consuming database queries, the present invention communicates the configuration of attributes between the website and the data collection server using a configuration string. The configuration string identifies all the information about an attribute. Data type, expiration and version information are all encoded in the configuration string. Upon receiving event data, the data collection server examines the configuration string. For example, the configuration string may indicate that the data type of custom variable is a text string or a counter increment. The configuration string may also indicate the version and whether the variable expires upon the occurrence of a particular event.

The website operator can create the configuration strings using a configuration string tool. The website operator may choose the configuration of a particular attribute through a graphical user interface by selecting the data type, expiration and version information. The configuration string tool then provides the website operator with a string to be used in the code to be used on the web server. The website operator combines the configuration string with data collection code to be used on the website. The configuration strings and data collection code are combined with the code for the website. In another embodiment, the configuration string tool may place the configuration string in the data collection code automatically.

Once the configuration string is combined with the data collection code, the data collection system is configured to collect custom events and attributes. The present invention thereby allows the website operator to configure the data collection server to match the requirement of the website without assistance from the data collection server administrator. The website operator can also modify the configuration at any time by repeating the steps discussed above. In this manner, the present invention provides the website operator with the ability to track custom-designed events and attributes that more accurately describe the operation of the particular website. Furthermore, when changes to the tracking data are required, the website operator can effect those changes without needing assistance from others.

Further features of the invention, its nature and various advantages will be more apparent from the accompanying drawings and the following detailed description.

BRIEF DESCRIPTION OF THE DRAWINGS

The accompanying drawings illustrate several embodiments of the invention and, together with the description, serve to explain the principles of the invention.

DETAILED DESCRIPTION OF THE EMBODIMENTS

The present invention is now described more fully with reference to the accompanying figures, in which several embodiments of the invention are shown. The present invention may be embodied in many different forms and should not be construed as limited to the embodiments set forth herein. Rather, these embodiments are provided so that this disclosure will be thorough and complete and will fully convey the invention to those skilled in the art.

Figure 1:
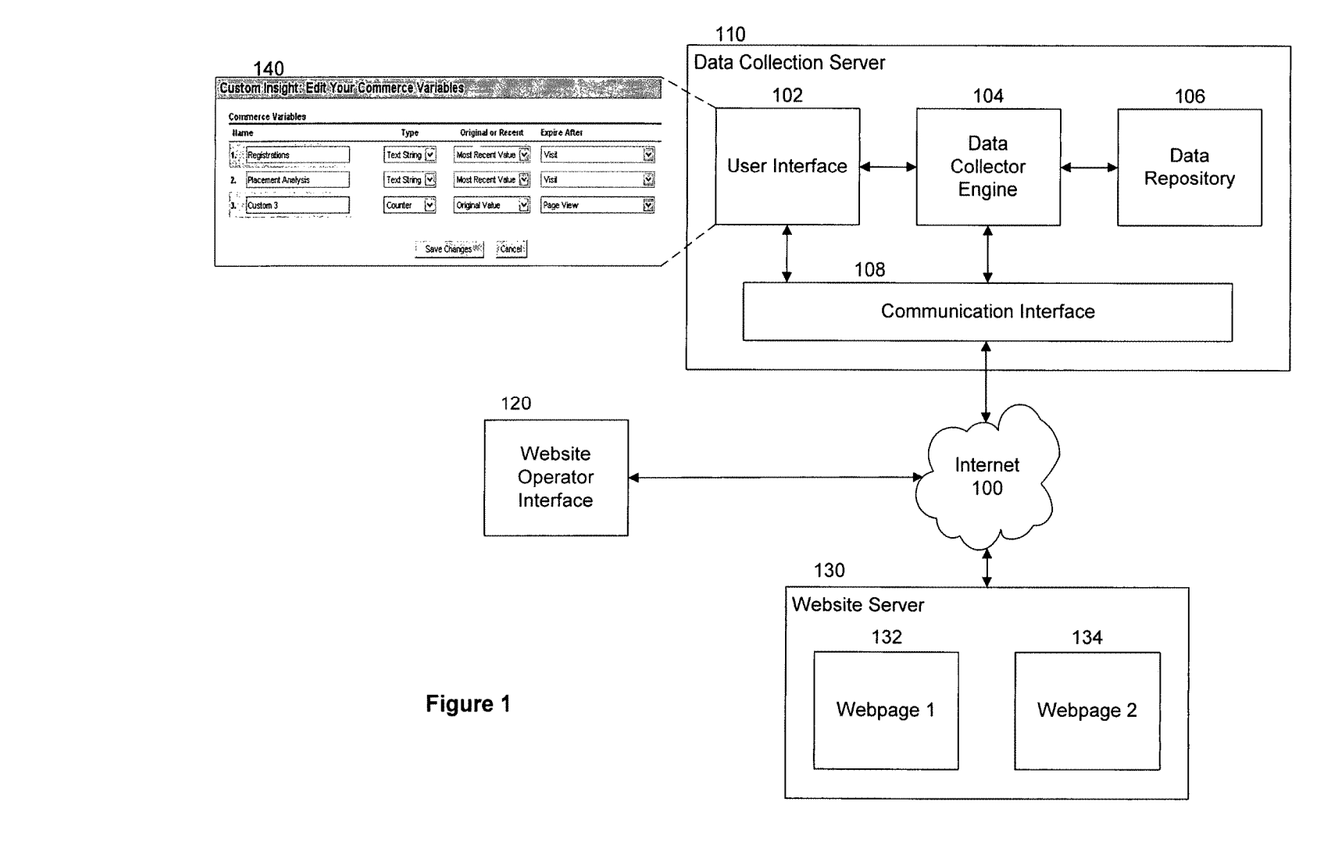
FIG. 1 is a block diagram illustrating a data collection system according to one embodiment of the present invention.

FIG. 1 is a block diagram illustrating a data collection system according to one embodiment of the present invention. The data collection system includes a data collection server 110, a website operator interface 120, the Internet 100, and a website server which further includes a web page 132A and a web page 132B. The data collection server 110, the website operator interface 120, and the website server 130 are all connected to the Internet 100. The data collection server 110 further comprises a user interface 102, a data collector engine 104, a data repository 106, a communication interface 108, and an example of a graphical user interface 140. The communication interface 108 is connected to the Internet 100 and is also connected to the user interface 102, and the data collector engine 104. The data repository 106 is connected to the data collector engine 104.

The website operator interface 120 may connect to the Internet 100 independently via a browser, or may connect to the Internet 100 using the website server 130. The website server 130 includes the website where customer data is to be tracked. The website may contain multiple web pages, for example, web page 132A and web page 132B.

For events on the website to be tracked, the website server 130 includes two files: an embedded tracking code, and a data collection file. The embedded tracking code may be a request for a web bug or other resource. The embedded tracking code may also include HTML code, JavaScript, another mark-up or scripting language, or any combination of these. The embedded tracking code may be included on each web page for which customer behavior is to be tracked.

The present invention can also track events on the website using one file. Using only one file, the data collection file and the embedded tracking code are combined. This combined code is included on each web page for which customer behavior is to be tracked.

The embedded tracking code is included somewhere in the code for the web page. For example, if web page 132A includes an event to be tracked, the embedded tracking code is embedded within the code for web page 132A. When a client renders the web page, the embedded tracking code causes the event occurring on web page 132A to be tracked. If the website operator wants to track events on web page 132B, the embedded tracking code would likewise be embedded within the code for web page 132B.

To fully implement the customized tracking features, the embedded tracking code includes comments that are transparent to the client rendering the web page, but provide an opportunity to customize the events and attributes to be tracked. An example of an embedded tracking code implementing the customization of events and attributes of the present invention is shown below:

```
<script language="JavaScript">
<!--/* You may give each page an identifying name, server, and channel
on the next lines. */
    var s_pageName="Home"
    var s_server=""
    var s_channel=""
    var s_pageType=""
    var s_prop1=""
    var s_prop2=""
    var s_prop3=""
    var s_prop4=""
    var s_prop5=""
/* E-commerce Variables */
    var s_campaign=""
    var s_state=""
    var s_zip=""
    var s_events=""
    var s_products=";"
    var s_purchaseID=""
    var s_eVar1=""
    var s_eVar2=""
    var s_eVar3=""
    var s_eVar4=""
    var s_eVar5=""
    var s_eVar6=""
    var s_eVar7=""
    var s_eVar8=""
    var s_eVar9=""
    var s_eVar10=""
/* Specify the Report Suite ID(s) to track here */
    var s_account="omniture"
/** INSERT THE DOMAIN AND PATH TO YOUR CODE
BELOW **///-->
</script><script language="JavaScript"
src="http://www.omniture.com/includes/s_code_remote.js"></script>
<!-- End SiteCatalyst code version: G.0. -->
```

The embedded tracking code causes the data collection code located at "www.webserver.com/includes/s_code_remote.js" to be executed. The data collection code may cause the client to collect data on the occurrence of many different events such as page loads, or even more complicated events such as mouse clicks or scrolling. Upon the occurrence of the event to be tracked, the data collection code passes the data to the variables as listed above. Then the tracking data is sent to the data collection server 110 and stored for analysis.

In this example, the data collection code is a JavaScript file located at "www.webserver.com." However, the data collection code may be any code that can be executed by a client rendering a web page. Moreover, the location of the data collection code is flexible. The data collection code can be placed on the website itself, or in another location on a network.

For a website that sells cars, the website operator may wish to analyze the traffic on the website by car styles. The website operator selects the variable corresponding to s_prop1 to receive "Car Styles" at the data collection server 110. The website operator can make this assignment by accessing the user interface 102 of the data collection server 110 via the communication interface 108 through the Internet 100. Then, if web page 132A contains sedans, and web page 132B contains sport utility vehicles, the var s_prop1 statement in the above embedded tracking code placed on web page 132A would appear as var s_prop1="sedan" and the code placed on web page 132B would appear as var s_prop2="sport utility vehicle."

When a customer views web page 132A looking for sedans, the customer's client renders the code for web page 132A. Upon rendering that code for web page 132A, the client encounters the embedded tracking code including the customized variable. The data collection code executes as a result of the embedded tracking code and sends "sedan" to the variable corresponding to s_prop1 at the data collection server 110. The data collection server 110 may store the event including the "Car Style" as "sedan." The traffic on the website can now be analyzed and categorized according the "Car Style" segment data.

The present invention is also able to create and track custom events. A number of predefined events may be present in the data collection server 110. Upon the occurrence of these events, the data collection server 110 receives certain predefined information for use in traffic analysis. For example, a predefined event may be a purchase. Upon the occurrence of a purchase, the data collection server 110 receives information related to the purchase, such as purchase price, number of units sold, etc. In order to track an event, the event is placed in the var s_event variable in the web bug code. For example, to track a purchase event, the website operator replaces the "var s_event=""" line with "var s_event="purchase.""

Furthermore, multiple events can be configured within this variable. The website operator may include the line "var s_event="scOpen, scAdd, prodView"" to signify that on the web page 132A a shopping cart was opened, a product was added, and a product was viewed. Each of these events causes the data collection code to gather specific data and send it to the data collection server 110 upon the occurrence of the event. For example, the prodView event may cause the data collection code to gather data identifying the product on the page being loaded, and also gather data identifying the categories to which the product belongs. The scAdd event may cause the data collection code to gather information identifying the products added to the shopping cart.

The events discussed are examples of predefined events, programmed to perform certain function on the occurrence of certain events. The present invention allows the website operator to define his own custom events so that the data collection system can collect events other than the predefined events.

To configure a custom event, the website operator 120 selects one of a number of customizable events. The data collection server 110 is configured to accept a number of customizable events labeled event 1, event 2, event3 . . . event N where N is a positive integer. The website operator chooses the next unused event, such as event2, and places that event designation in the s_event variable. For example, the website operator would replace the "var s_event=""" line with "var s_event="event2 "" in a embedded tracking code on a page where the event occurs. Then the website operator uses the user interface 102 to give event2 an appropriate name, such as "Bids Placed" for an auction site.

Figure 2:
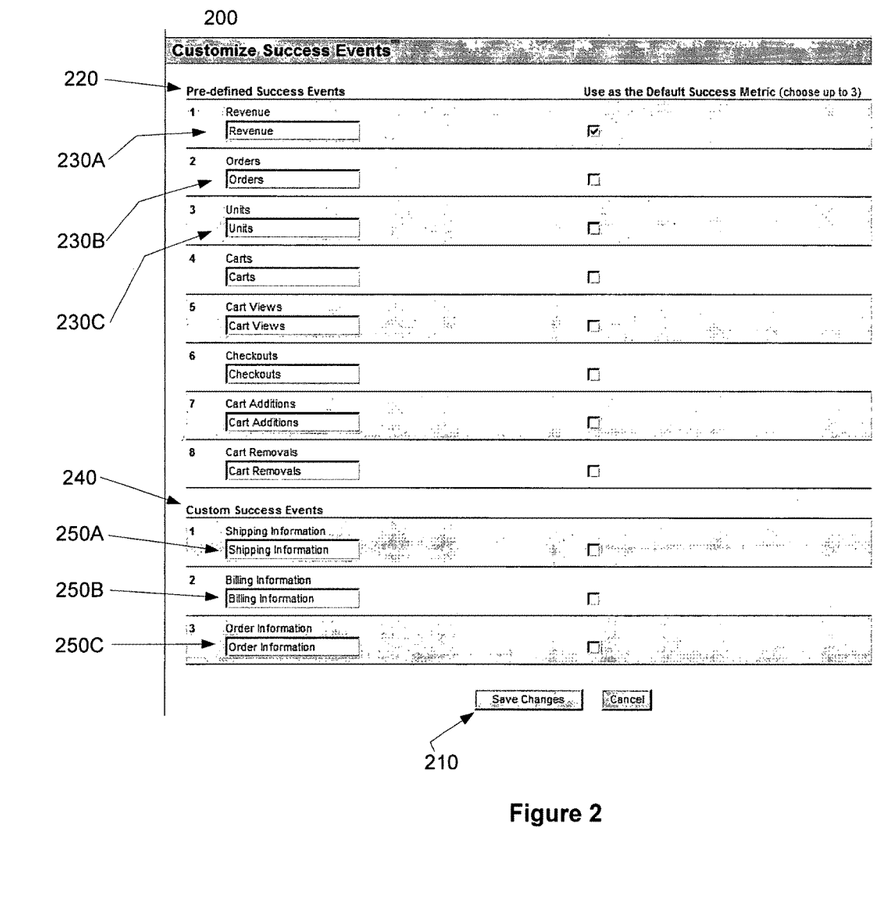
FIG. 2 is an example of a dialog box of the graphical user interface for configuring custom events according to one embodiment of the present invention.

FIG. 2 illustrates an example of a dialog box of the GUI that the website operator may use to create custom events on the data collection server 110. The graphical user interface includes a window 200 displaying both predefined events 220 and custom events 240. In order to configure the data collection server 110 to receive a custom event, the website operator names the custom event 240 corresponding to the event variable used in the web bug code. Recall in the above example that event2 was used for the event "Bids Placed." To configure the data collector, the website operator identifies the second custom event 250B and names that event "Bids Placed."

A number of predefined and custom events are available for use by the website operator. More or fewer predefined and custom events may be used. The following table illustrates an example of the predefined and custom events available and the data sent to the data collection server 110:

TABLE 1

| Value Passed into s_event = "" | Definition of Value | Tracking Data |
|---|---|---|
| purchase | Purchase | Revenue, Units, Orders |
| prodView | Product View | Products, Categories |
| scOpen | Shopping Cart Open | Carts |
| scAdd | Add to Shopping Cart | Cart Additions |
| scRemove | Remove from Shopping Cart | Cart Removals |
| scView | View Shopping Cart | Cart Views |
| scCheckout | First Page of Checkout | Checkouts |
| event1 | Defined by Website Operator | Custom Variables |
| event2 | Defined by Website Operator | Custom Variables |
| event3 | Defined by Website Operator | Custom Variables |
| event4 | Defined by Website Operator | Custom Variables |
| event5 | Defined by Website Operator | Custom Variables |

These can be compared with the event page 200 of the graphical user interface. Each event creates associated tracking data as seen in the graphical user interface. For example, a purchase event modifies revenue, units, and orders. These events can be seen in the predefined success events section 220 of the graphical user interface as revenue 230A, orders 230B, and units 230C.

When the purchase event occurs, the tracking data associated with the embedded tracking code is sent to the data collection server 110. The data collector engine 104 receives via the communications interface 108 the revenue, units, and orders information associated with the purchase event. Then the data collector engine 104 matches the purchase event sent with the tracking data with the revenue, orders, and units configured as shown on the custom events page 200. The data collector engine 104 stores the tracking data in the data repository 106.

Another component of the custom event feature is the ability to associate custom attributes with the event. For example, additional information may be associated with the event "Bids Placed" to make the tracking data meaningful.

To configure the website for a custom attribute for an event, the name of the custom attribute is placed in one of the "var s_eVar1=""" declarations. For example, a website operator may want to, track customers referred from affiliated sites. If customers referred from AffiliateA enter the site though web page 132B, the website operator changes the line in the web bug on web page 132B to "var s_eVar1="AffiliateA.""

Figure 3:
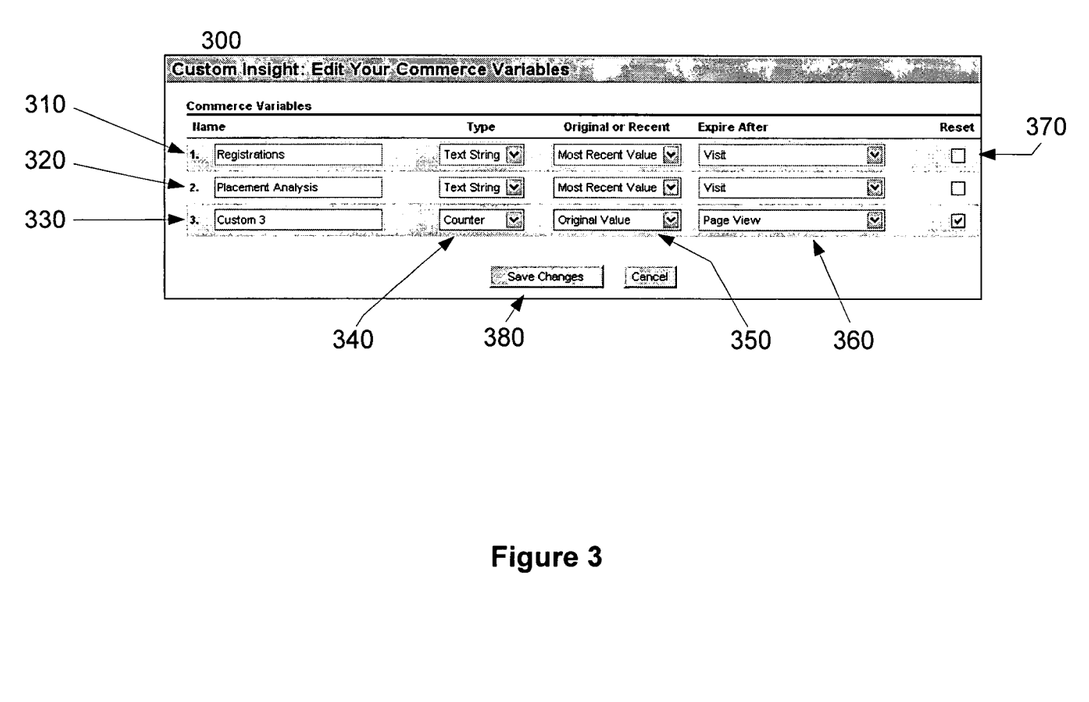
FIG. 3 is an example of a dialog box of the graphical user interface for configuring custom attributes according to one embodiment of the present invention.

Then, the website operator configures the custom attribute corresponding to eVar1 on the data collection server 110 using the user interface 102. FIG. 3 is an example of a dialog box 300 from the user interface 102 for configuring custom attributes. Each custom attribute corresponds with an eVar from the web bug. For example, eVar1 corresponds to custom variable 310 on the dialog box 300. Similarly, eVar2 corresponds to custom variable 320 and eVar3 corresponds to custom variable 330. Therefore, to configure the data collector to use custom variable 310 for affiliate tracking, custom variable 310 may be changed to "Referring Site" or some other meaningful tag.

In the above affiliate example, when a customer is referred to the website by AffiliateA, the embedded tracking code on web page 132B is executed when the page is rendered. The custom event, a referral, is triggered and the custom attribute "AffiliateA" is sent to the data collection server 110. The data collector engine 104 matches AffiliateA with the custom event configured by the website operator corresponding the eVar1, which in this case is "Referring Site." Then the data collection engine 104 stores the data in the data repository 106. Now the data can be analyzed according to the "Referring Site" custom attribute.

Custom attributes can be configured to operate in a number of ways. In the above affiliate example, the attribute is a text string. However, the attribute may also be a counter-type attribute. For example, the website may include a product demonstration. The website operator may want to track how many times the demonstration is viewed by customers. Instead of collecting text strings, the data collector can increment or decrement a counter. Counter-type attributes do not actually pass the value of the counter; the attribute contains an integer to increment or decrement a counter resident in the data collection server 110.

A website operator would implement a counter-type attribute for the demonstration example by configuring, for example, the custom attribute 330 on the data collection server 110 as "Demos Viewed." Then, to configure the data collection server 110 to treat this custom attribute as a counter increment, the website operator uses the drop-down boxes 340 of the dialog box 300 to indicate the counter data type. The website operator also configures the code in the embedded tracking code on the page where the demonstration launches to "var eVar2="+1."" When a customer launches the demonstration and the demonstration page loads, the embedded tracking code is rendered and the tracking data is sent to the data collection server 110. The data collector engine 104 receives the tracking data including "eVar2="+1"" and increments the counter associated with eVar2 on the data collection server 110.

The custom attributes can also be configured to use other data types as well. Two other examples of useful data types are hierarchical data and list data. Hierarchical data specifies a hierarchical path or category definition that allows the data to be analyzed differently that plain text data. The path or category levels are separated by delimiters to indicate to the data collection server 110 the hierarchy of the category or path. For example, a newspaper site may use custom variable so indicate the path a reader follows to view a particular article. The data passed into a custom attribute may be "Sports/Mens/Basketball."

The data collection server 110 can parse the hierarchy information according to the delimiters in order to use the path or category data in analysis of the traffic data. For instance, the data collection server 110 can present the tracking data for the category "Mens." Or, it can present the tracking data for the broader category "Sports." This method allows the tracking data to be analyzed at different levels of detail, according to the needs of the website operator.

List data is used where more than one attribute of the same data type is associated with a single event. The multiple attributes are configured in the custom attribute variable in the embedded tracking code by separating them with commas. For example, the following variable is configured to indicate that product1, product2 and product3 are all associated with a particular event:

var s_eVar1="product1, product2, product3"

Custom attributes may be configured to be persistent. Persistent attributes retain the same value for the duration of the customer's visit to the website or longer. Persistent attributes can have the same value indefinitely. Persistent custom attributes allow the website operator to set a given value just once on the website, usually when the event associated with the attribute is first encountered by a visitor to the site. The persistent attribute data will be associated with the visitor for future events. For example, in the previous affiliate example, the website operator may set the value of an affiliate attribute only on the first web page encountered by visitors referred from the affiliate website. The affiliate attribute would retain that value for all subsequent actions made by the visitor on the website. If the visitor makes a purchase, the original affiliate may be associated with that purchase, allowing the website operator to analyze the purchase traffic by affiliate. Furthermore, the persistent custom attribute can be associated with the visitor through the use of a cookie or other method such that the persistent custom attribute is available during subsequent events and actions.

To provide the website operator with further control over attributes, custom attributes may also be assigned expiration information to allow the attributes to interact with other events. Attributes can expire after a predefined time period, or can expire upon the occurrence of an event. For example the attribute value can expire after a single visit to the website, after the customer leaves the page where the event occurs, after the customer makes a purchase or after some predetermined time period. Conversely, an attribute can be persistent and be configured to last indefinitely. The website operator may also define how the data collection system handles conflicts of values. For example, when the visitor encounters an event that may cause the data collection system to overwrite or replace an attribute value, the data collection system may be configured to either use the original value, the most recent value, or some intermediate value.

The website operator may configure these values through the dialog box 300 illustrated in FIG. 3. The dialog box 300 provides a drop-down selection box 350 for selecting whether the data collection server collects the most recent value or the original value of a particular attribute. Similarly, the expiration configuration for each custom attribute can be defined using the drop-down selection box 360 for expiration values. In this manner, the configuration of the data collection server 110 for the custom attributes can be performed efficiently by the website operator. One skilled in the art will recognize that the particular arrangement of dialog box 300 is merely exemplary.

Custom attributes also may contain version information. Along with specifying the variable type and expiration for custom attributes, the website operator is also able to specify the version number of the current attribute. This feature can be useful if it is necessary to reset an attribute, or reuse it for a different purpose. If an attribute is to be reused or reset, it is important to destroy any previous values associated with that variable. For example, if an attribute is created to track the affiliate that referred a customer to the website, and has been set to never expire, the data collection system would be unable to change the currently stored values without a new version of the attribute. By changing the version number of an attribute the website operator can effectively declare all previously stored data in that attribute as obsolete and ignore it. In this manner, the website operator can configure the data collection system to collect specified versions of tracking data and ignore obsolete data.

The custom attribute configuration data is stored in a configuration string. This string is created by the data collection server 110, and then placed in the tracking code on the website by the website operator. The website operator uses a tool located at the data collection server 110 that the website operator accesses through the user interface 102. The configuration tool generates a configuration string that includes all the configuration information for a custom attribute. The configuration string encodes the configuration data in compact form such as 'var s_eVarCFG="56j-y78-89f-7yt."' The website operator then copies this configuration string and pastes it on the website at an appropriate location. One appropriate location would be in the data collection code that collects the tracking data. The data collection code contains a special section for configuration information for all the custom attributes. The website operator replaces the old configuration string with the new one created by the configuration tool. In another embodiment, the configuration string tool automatically inserts the configuration string into the data collection code.

Now that the data collection code contains the configuration string, the website server does not need to query the data collection server 110 to determine the configuration information of the custom variables. This technique provides faster processing of custom variables and eliminates unnecessary network traffic.

Figure 4:
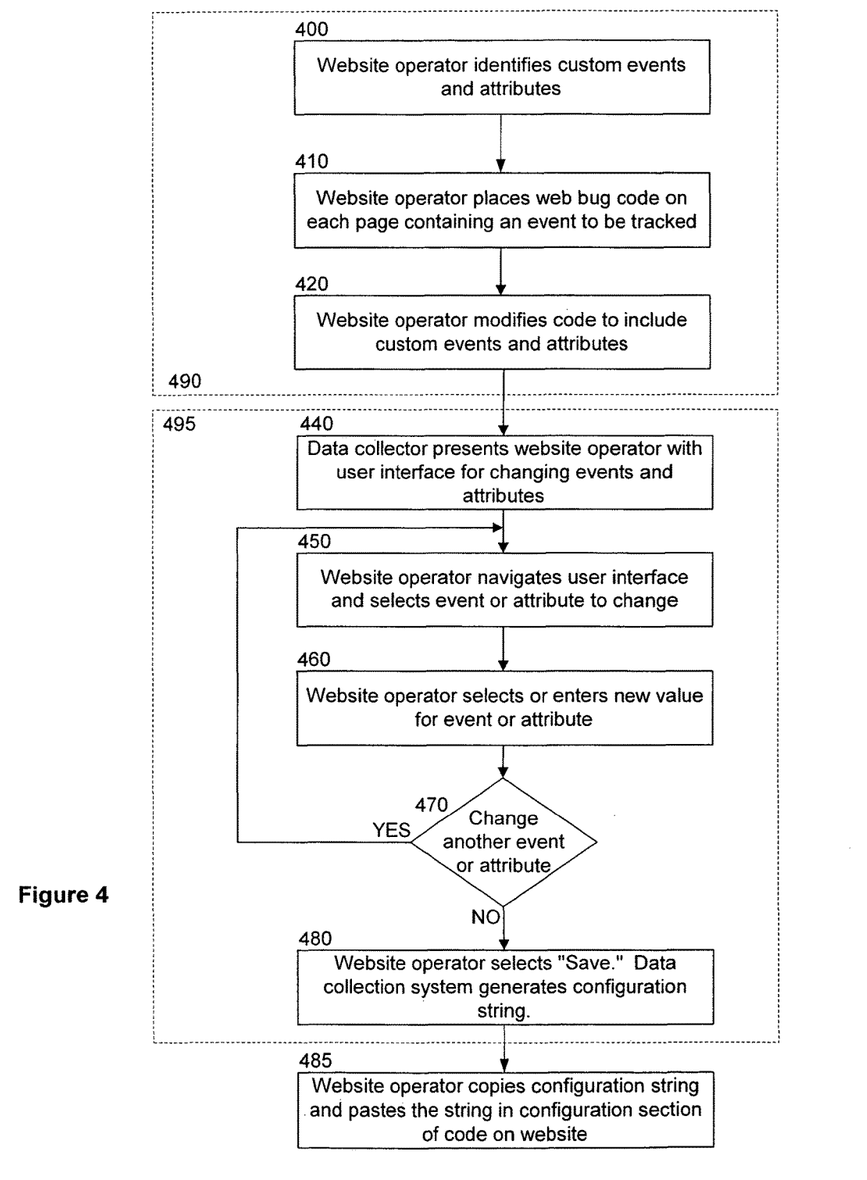
FIG. 4 is a flowchart illustrating how a website operator may customize events and attributes using one embodiment of the present invention.

FIG. 4 illustrates one example of how a website operator may create custom events and attributes according to one embodiment of the present invention. First the website operator must configure 490 the website to use the custom events and attributes. The website operator identifies 400 custom events and associated attributes for use on the website. Next, the website operator places 410 the embedded tracking code on each web page containing an event to be tracked. The website operator then modifies 420 the code to include the custom events and attributes.

After configuring the website for the custom events and attributes, the website operator configures 495 the data collection server 110 to collect the custom event and attribute data. The data collection server 110 presents 440 the website operator with a graphical user interface via the user interface 102 for configuring the events and attributes. The website operator navigates the user interface and selects 450 events and attributes to modify. The website operator then enters 460 new values corresponding to the custom events and attributes on the website. When the website operator is done changing 470 the custom events and attributes in use on the website, the website operator selects the "Save" button.

The data collector engine 104 may then generate a configuration string and present it to the website operator through the user interface 102. The website operator copies this configuration string and pastes it into the data collection code on the website at a location reserved for the configuration strings. The configuration string may also be automatically pasted into the appropriate location in the data collection code. At this point, the data collection system is ready to collect traffic data using the custom events and attributes.

Figure 5:
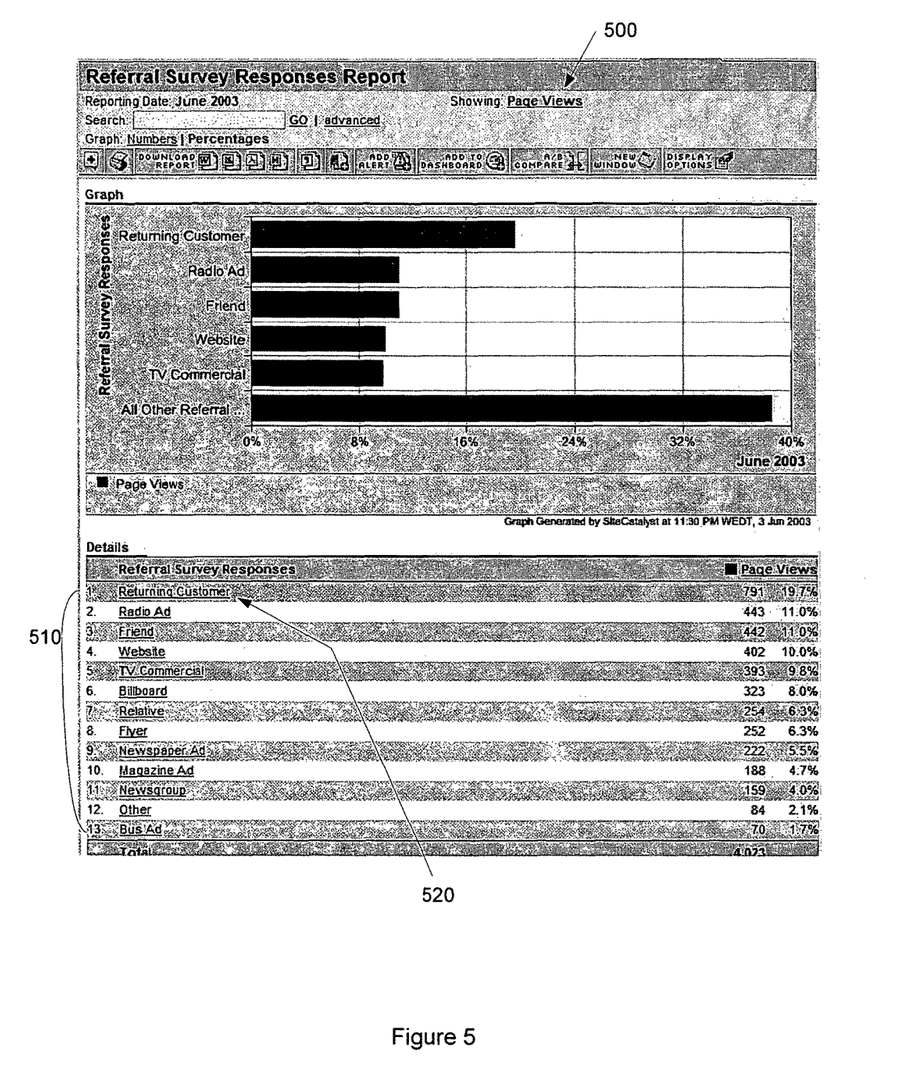
FIG. 5 is an illustration of a graphical user interface for presenting traffic data collected by the data collection system organized by referrals, according to one embodiment of the present invention.

After collecting traffic tracking data, the data collection system may present the data to the website operator through a graphical user interface. The website operator can manipulate data collection server via a graphical user interface to display traffic data categorized by event or attribute, or a combination of events and attributes. For example, the website operator may manipulate the data collection server via the graphical user interface to display visits to a website by how the visitors were referred to the website. FIG. 5 illustrates an example of a graphical user interface displaying page views on the website according to how visitors were referred to the website by various referring sources such at television advertisements, returning customers, and radio advertisements. The report categorizes 510 the page views by visitor responses to a referral survey and orders the results in descending order of number of page views. The website operator may learn further information about which items a visitor purchased by selecting a category, such as "Returning Customer" 520.

Figure 6:
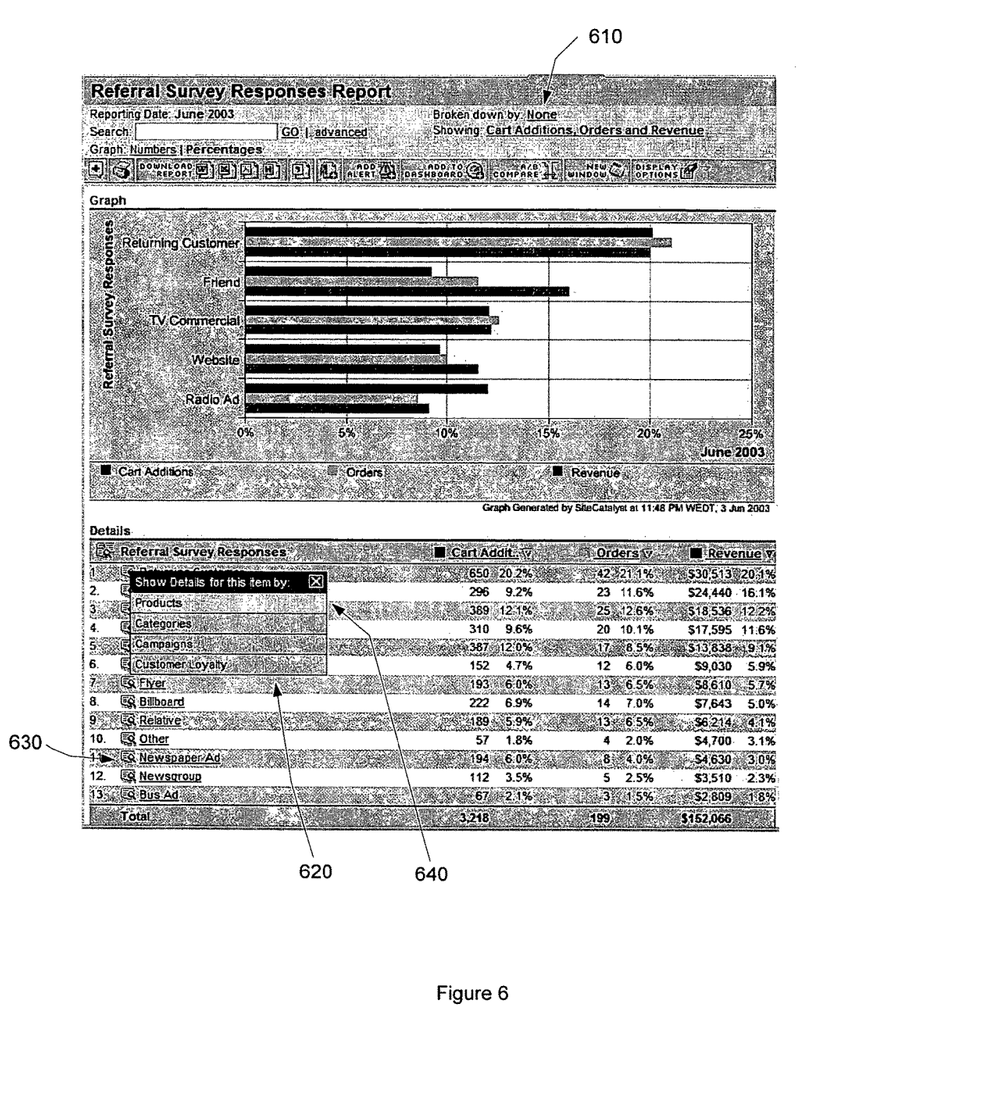
FIG. 6 is an illustration of a graphical user interface for presenting the website operator with a selection of topics for further categorization of the data collected by the data collection system, according to one embodiment of the present invention.
Figure 7:
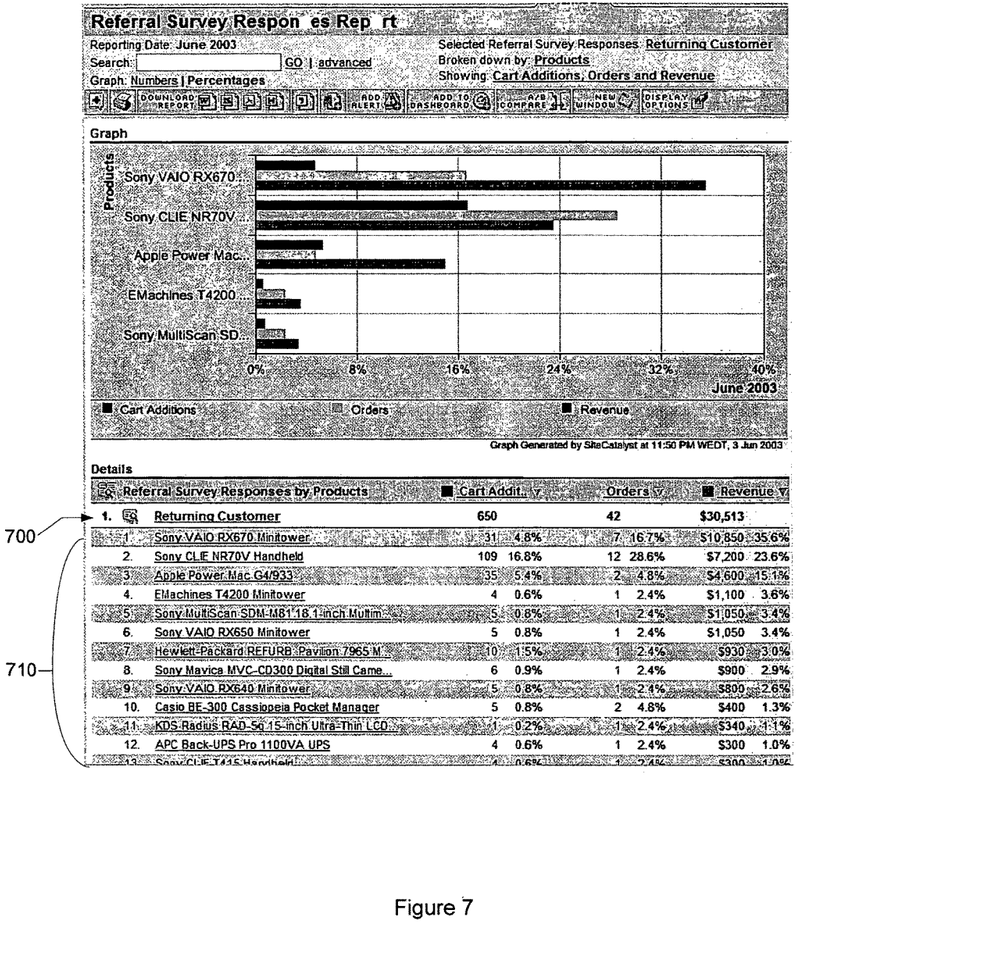
FIG. 7 is an illustration of a graphical user interface presenting a break-down of further categories of products that returning customers placed in their carts, ordered, and generated revenue, according to one embodiment of the present invention.

Turning to FIG. 6, after the category has been selected, the graphical user interface presents the website operator with a list box 620 of choices for further categorization. The website operator can categorize the tracking data from the category "Returning Customers" by product by selecting "Products" 640 from the list box 620. FIG. 7 illustrates the results of this selection according to one embodiment of the present invention. For example, the graphical user interface presents the products that each returning customer placed in their cart, ordered, or purchased. Under "Returning Customer" 700, the graphical user interface displays a list 710 of each product, ordered in descending order of cart additions, orders, and revenue. In this manner, the present invention provides the website operator with a convenient method to perform in-depth analysis of the traffic on a website.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer.

Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer, network of computers, or other apparatus. Various general-purpose systems may be used with programs in accordance with the teachings herein, or it may prove convenient to construct a more specialized apparatus to perform the required method steps. The required structure for a variety of these systems appears from the description. In addition, the present invention is not described with reference to any particular programming language. It will be appreciated that a variety of programming languages may be used to implement the teachings of the invention as described herein.

As will be understood by those familiar with the art, the invention may be embodied in other specific forms without departing from the spirit or essential characteristics thereof. For example, the particular architectures depicted above are merely exemplary of one implementation of the present invention. The functional elements and method steps described above are provided as illustrative examples of one technique for implementing the invention; one skilled in the art will recognize that many other implementations are possible without departing from the present invention as recited in the claims. Likewise, the particular capitalization or naming of the modules, protocols, features, attributes, or any other aspect is not mandatory or significant, and the mechanisms that implement the invention or its features may have different names or formats.

In addition, the present invention may be implemented as a method, process, user interface, computer program product, system, apparatus, or any combination thereof Accordingly, the disclosure of the present invention is intended to be illustrative, but not limiting, of the scope of the invention, which is set forth in the following claims.

What is claimed is:

1. A method for customizing traffic tracking for an online content site accessed via the Internet, the method comprising:
    generating by a processor, tracking code for a content page of a content site;
    providing by the processor, a graphical user interface comprising user interface elements for specifying creation of a custom event;
    receiving user input, by the processor via the graphical user interface, defining the custom event by specifying a combination of a content item and an interaction with the content item, wherein the combination of the content item and the interaction is specific to the content site;
    generating, by the processor, custom configuration data based on the custom event specified through the user input, wherein the custom configuration data comprises data identifying the combination of the interaction and the content item that is specific to the content site; and
    providing, by the processor, the custom configuration data for embedding into the tracking code for the content page of the content site,
    wherein embedding the custom configuration data into the tracking code modifies the tracking code for tracking occurrences of the custom event.

2. The method of claim 1, wherein the graphical interface further comprises additional user interface elements for specifying custom attribute for of the custom event or another event for the content site,
    wherein the custom configuration data is also generated based on the custom attribute,
    wherein embedding the custom configuration data further modifies the tracking code for tracking occurrences of the custom event or the other event by updating a value of the custom attribute.

3. The method of claim 2,
    wherein generating the custom configuration data based on the custom attribute comprises assigning expiration data to the custom attribute in the custom configuration data, the expiration data specifying a condition under which the value of the custom attribute is to be replaced by another value; and
    wherein the custom configuration data comprises a representation of the expiration data.

4. The method of claim 3, wherein generating the custom configuration data based on the custom attribute further comprises:
    assigning version data to the custom attribute,
    wherein the custom configuration data comprises a representation of the version data.

5. The method for customizing traffic tracking for a content site of claim 1 further comprising:
    inserting the custom configuration data in data collection code on the content page; and
    tracking occurrences of the custom event by executing the tracking code as modified with the custom configuration data.

6. The method of claim 1, wherein the interaction with content item comprises playing an electronic demonstration of the content item and wherein tracking an occurrence of the custom event comprises identifying the content item and associating the content item with a playback of the electronic demonstration.

7. The method of claim 1, wherein the combination of the interaction and the content item comprises a purchase of the content item.

8. The method of claim 7, wherein the purchase comprises a plurality of events comprising:
   selecting a purchase interface; and
   selecting the content item for purchase via the purchase interface.

9. The method of claim 1, wherein the interaction comprises a plurality of events and providing the user elements for specifying the creation of the custom event comprises providing user elements for specifying each of the plurality of events comprising the interaction.

10. The method of claim 1, wherein the generated custom configuration data indicates a name of the custom event, a data type for the custom event, and version information for the custom event, wherein the custom configuration data is provided via a data network to a content server that hosts the content site, wherein the method further comprises:
   configuring a data collection server for matching tracking data received from the content server with the custom event, wherein configuring the data collection server comprises modifying, based on the user input, a tracking variable at the data collection server to correspond to the name, the data type, and the version information indicated by the custom configuration data;
   receiving, after providing the custom configuration to the content server, the tracking data at the data collection server; and
   matching, by the data collection server, the received tracking data with the custom event using the modified tracking variable.

11. The method of claim 10, further comprising:
   providing access to the content site via the data network;
   inserting the custom configuration data received from the computing device on the content page;
   tracking occurrences of the custom event by executing the tracking code as modified with the custom configuration data; and
   transmitting the tracking data from the content server to the data collection server in response to tracking occurrences of the custom event.

12. A non-transitory computer-readable medium storing computer readable code the computer readable code executable by a computing device to perform operations comprising:
   generating tracking code for a content page of a content site;
   providing a graphical user interface comprising user interface elements for specifying creation of a custom event;
   receiving user input, via the graphical user interface, defining the custom event by specifying a combination of a content item and an interaction with the content item, wherein the combination of the content item and the interaction is specific to the content site;
   generating custom configuration data based on the custom event specified through the user input, wherein the custom configuration data comprises data identifying the combination of the interaction and the content item that is specific to the content site; and
   providing the custom configuration data for embedding into tracking code for the content page of the content site,
   wherein embedding the custom configuration data into the tracking code modifies the tracking code for tracking occurrences of the custom event.

13. A system comprising:
   a computing device; and
   a non-transitory computer-readable medium communicatively coupled to the computing device,
   wherein the computing device is configured to execute instructions stored in the non-transitory computer-readable medium to perform operations comprising:
      generating tracking code for a content page of a content site;
      providing a graphical user interface comprising user interface elements for specifying creation of a custom event,
      receiving, via the graphical user interface, input defining the custom event by specifying a combination of a content item and an interaction with the content item, wherein the combination of the content item and the interaction is specific to the content site,
      generating custom configuration data based on the custom event specified through the user input, wherein the custom configuration data comprises data identifying the combination of the interaction with the content item that is specific to the content site, and
      providing the custom configuration data for embedding into tracking code for the content page of the content site, wherein embedding the custom configuration data into the tracking code modifies the tracking code for tracking occurrences of the custom event.

14. The system of claim 13, further comprising an additional computing device in communication with the computing device, the additional computing device configured for:
   providing access to the content site via a data network;
   inserting the custom configuration data received from the computing device on the content page; and
   tracking occurrences of the custom event by executing the tracking code as modified with the custom configuration data.

15. The system of claim 13, wherein the interaction with content item comprises playing an electronic demonstration of the content item and wherein tracking an occurrence of the custom event comprises identifying the content item and associating the content item with a playback of the electronic demonstration.

16. The system of claim 13, wherein the combination of the interaction and the content item comprises a purchase of the content item via the content site.

17. The system of claim 16, wherein the purchase comprises a plurality of events comprising:
   selecting a purchase interface; and
   selecting the content item for purchase via the purchase interface.

18. The system of claim 13, wherein the interaction comprises a plurality of events and providing the user elements for specifying the creation of the custom event comprises providing user elements for specifying each of the plurality of events comprising the interaction.

* * * * *